(12) United States Patent
Weinman, Jr.

(10) Patent No.: US 9,959,302 B2
(45) Date of Patent: *May 1, 2018

(54) METHOD AND APPARATUS FOR PROVIDING TRAFFIC-BASED CONTENT ACQUISITION AND INDEXING

(71) Applicant: AT&T Intellectual Property I, L.P., Atlanta, GA (US)

(72) Inventor: Joseph Bernard Weinman, Jr., Basking Ridge, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 818 days.

This patent is subject to a terminal disclaimer.

(21) Appl. No.: 14/492,781

(22) Filed: Sep. 22, 2014

(65) Prior Publication Data
US 2015/0012516 A1    Jan. 8, 2015

Related U.S. Application Data

(63) Continuation of application No. 11/838,612, filed on Aug. 14, 2007, now Pat. No. 8,843,471.

(51) Int. Cl.
*G06F 7/00* (2006.01)
*G06F 17/30* (2006.01)
*H04L 12/741* (2013.01)
*H04L 29/08* (2006.01)

(52) U.S. Cl.
CPC .. *G06F 17/30321* (2013.01); *G06F 17/30864* (2013.01); *H04L 45/74* (2013.01); *H04L 67/02* (2013.01); *Y10S 707/959* (2013.01); *Y10S 707/966* (2013.01)

(58) Field of Classification Search
CPC . G06F 17/30321; G06F 17/706; H04L 67/02; H04L 45/74
USPC .......................................................... 707/711
See application file for complete search history.

(56) References Cited

U.S. PATENT DOCUMENTS

| | | |
|---|---|---|
| 5,893,091 A | 4/1999 | Hunt et al. |
| 6,473,400 B1 | 10/2002 | Manning |
| 6,490,577 B1 | 12/2002 | Anwar |
| 6,519,636 B2 | 2/2003 | Engel et al. |
| 6,701,314 B1 | 3/2004 | Conover et al. |
| 6,823,333 B2 | 11/2004 | McGreevy |
| 6,862,279 B1 * | 3/2005 | Imai ................... H04L 12/1854 370/389 |
| 6,938,046 B2 | 8/2005 | Cooke et al. |
| 6,999,957 B1 | 2/2006 | Zamir et al. |
| 7,162,691 B1 | 1/2007 | Chatterjee et al. |
| 7,260,564 B1 | 8/2007 | Lynn et al. |
| 7,324,990 B2 | 1/2008 | Jaschek et al. |
| 7,685,296 B2 * | 3/2010 | Brill ................... G06F 17/30864 709/204 |
| 7,895,158 B2 * | 2/2011 | Bosloy .................. G06Q 10/06 707/633 |

(Continued)

*Primary Examiner* — Binh V Ho

(57) ABSTRACT

A method and apparatus for processing packets in a network are disclosed. For example, the method scans one or more packets representing a content that is being transferred via the network, where the scanning acquires one or more content elements. The method then builds a keyterm index from the one or more content elements, and stores the keyterm index in a repository. A query handler then responds to queries in accordance with the keyterm index.

20 Claims, 3 Drawing Sheets

(56) References Cited

U.S. PATENT DOCUMENTS

| | | | |
|---|---|---|---|
| 8,065,292 B2* | 11/2011 | Yu | G06F 17/30864 |
| | | | 370/230 |
| 2002/0055972 A1* | 5/2002 | Weinman, Jr. | G06F 11/2058 |
| | | | 709/203 |
| 2003/0225858 A1 | 12/2003 | Keohane et al. | |
| 2005/0169173 A1 | 8/2005 | Mandavi | |
| 2006/0106866 A1* | 5/2006 | Green | G06F 17/30864 |
| | | | 709/224 |
| 2007/0061445 A1 | 3/2007 | Deganaro et al. | |
| 2007/0244857 A1 | 10/2007 | Yu | |
| 2010/0114561 A1 | 5/2010 | Yasin | |

* cited by examiner

METHOD AND APPARATUS FOR PROVIDING TRAFFIC-BASED CONTENT ACQUISITION AND INDEXING

This application is a continuation of U.S. patent application Ser. No. 11/838,612, filed Aug. 14, 2007, now U.S. Pat. No. 8,843,471 and is herein incorporated by reference in its entirety.

The present invention relates generally to communication networks and, more particularly, to a method for providing traffic-based content acquisition and information indexing for networks, e.g., a public network such as the Internet or a private network such as an enterprise Intranet.

BACKGROUND OF THE INVENTION

The World Wide Web is a network of computers and information resources, typically with some information resources referring to other information sources via hyperlinks. For example, text or images can be encoded such that they refer to a network address (e.g., an URL, or Uniform Resource Locator) of other information resources.

The World Wide Web has grown explosively over the last few years to become a very large scale, distributed, evolving repository of information resources. With this growth has come increased difficulty in identifying relevant information resources. To address this need, search engines have become a core capability of the Internet. For example, in performing a search, an Internet user may enter a word, a phrase, or a set of keywords into a web browser software, or a thin client toolbar running on the user's computer. The search engine, specifically its query processor, may find matching information resources, such as web pages, images, documents, videos, and so on, and provide a response to the user. Search engines have also become prevalent in Intranets, i.e., private enterprise networks, where keywords are used by such search engines to locate documents and files.

The search engine query processor may leverage a search database and content repository, populated by a type of software called a web crawler or web spider, operating in conjunction with an indexer. The web crawler follows hyperlinks to find locations on the web; visits each location it finds; and the indexer relates the web page content to the location where it was found for the purpose of responding to a search query at a later time. Content may be stored in compressed or uncompressed fashion in the content repository for the query handler to serve up in conjunction with the locations. Unfortunately, there are information resources that may exist and may be accessible without a hyperlink, but are not necessarily "published" via a hyperlink. For example, a user may access these unpublished locations by typing the Uniform Resource Locator (URL) into a location text box in a browser application. Furthermore, the content stored at a published location may also change without advance notice. Since the web crawler may not revisit the site for an extended period of time, the search engine is unaware of the change and may continue to respond to queries based on expired information.

For greater freshness, a web crawler may visit sites more often, but such an approach adds load to the network as well as the web servers populating it.

SUMMARY OF THE INVENTION

In one embodiment, the present invention discloses a method and apparatus for processing packets in a network. For example, the method scans one or more packets representing a content that is being transferred via the network, where the scanning acquires one or more content elements. The method then builds a keyterm index from the one or more content elements, and stores the keyterm index in a repository.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing traffic-based content acquisition and information indexing for a network, e.g., a public network such as the Internet or a private network such as an enterprise Intranet.

With the growth of the World Wide Web (WWW), locating relevant information resources has become increasingly difficult. As discussed above, the use of a traditional web crawler can be beneficial, but there are still many deficiencies.

Figure 1:
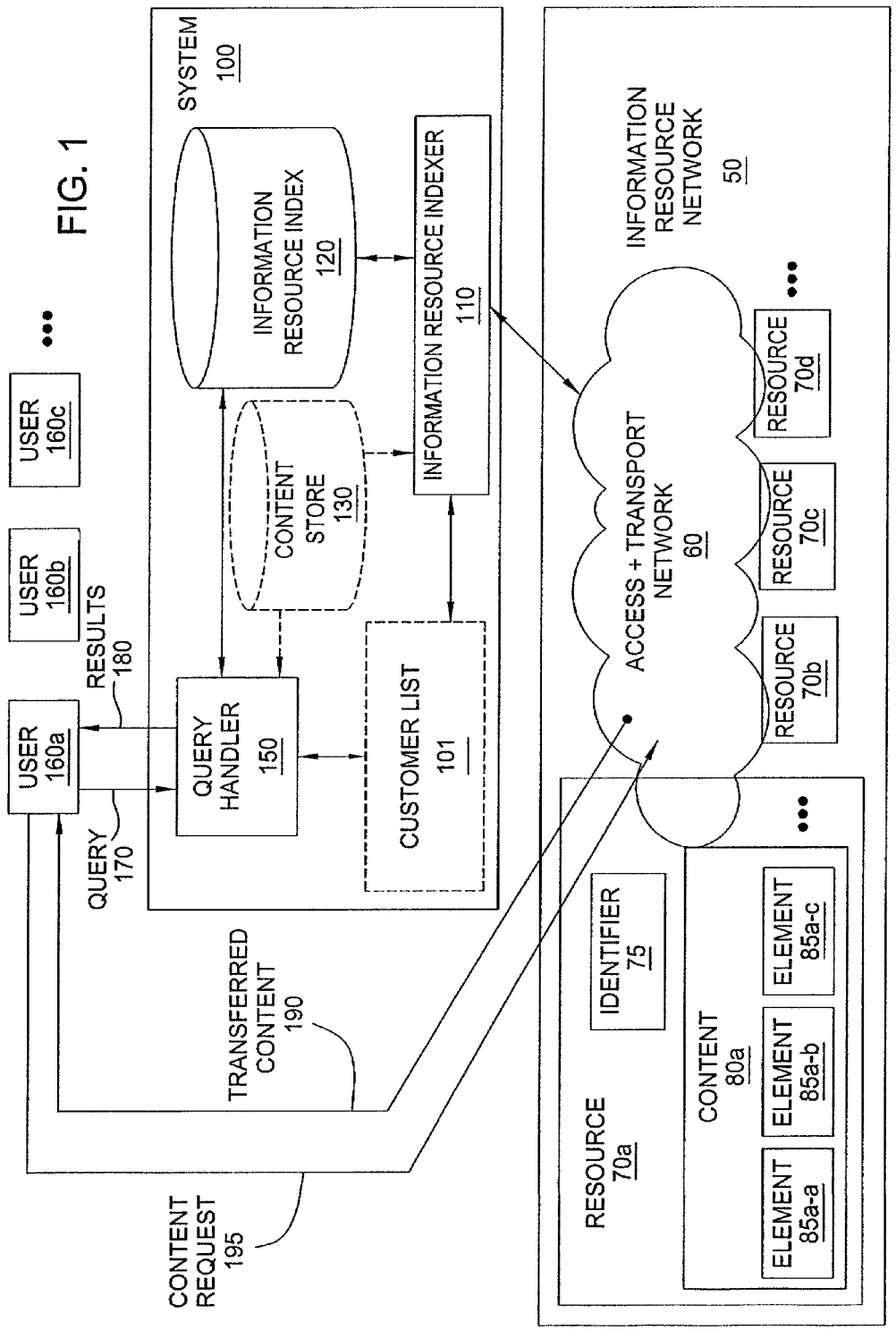
FIG. 1 illustrates an embodiment of a system of the present invention for use in combination with an information resource network and user.

In one embodiment, the current invention provides a method and an apparatus for providing traffic-based content acquisition for indexing. FIG. 1 illustrates an embodiment of a system 100 of the present invention for use in combination with an information resource network 50 and one or more users 160x (e.g., shown in FIG. 1 as 160a, 160b, and 160c, although the actual number of users may be lesser or greater).

In one embodiment, the information resource network 50 may comprise an access and transport network 60 (such as the Internet, an enterprise Intranet, or any other type of network, including routers, switches, multiplexers, transport facilities, and other components as are known in the art) and one or more information resources 70x (e.g., shown in FIG. 1 as 70a, 70b, 70c, and 70d). Each of the information resources may have a storage for storing web pages, images, videos, animations, music clips, documents, files, audio files or any other information resource as is known in the art. Each information resource 70 comprises a resource address or broadly a resource identifier 75 such as a URL, e.g., "http://www.uspto.gov/" that can be used to locate and access the information stored in a particular information resource.

Each information resource may have one or more types of stored content 80a-n (broadly referred to as content 80) that can be accessed and retrieved in response to a query. In one embodiment, the content comprises text information (broadly comprising alphanumeric characters). Although the present invention is disclosed below using text information as an example, those skilled in the art will realize that the present invention is not so limited. Namely, the stored content may comprise web pages, images, videos, animations, music clips, documents, files, audio files and the like.

For example, the text information may comprise actual text, e.g., "Welcome to the United States Patent and Trademark Office . . . ." In one embodiment, each content 80 may contain a plurality of content elements 85$a$-$n$ which can be derived from the content 80. For example, if content 80 is "Welcome to the United States Patent and Trademark Office", then content elements 85$i$ may comprise the words "Welcome", "to", "the", "United", "States", "Patent", "and", "Trademark,", and finally the word "Office". In FIG. 1, these content elements are shown for information resource 70$a$ as content element 85$a$-$n$, e.g., content element 85$a$-$a$, content element 85$a$-$b$, and so forth. It should be noted that the present invention is not limited by the number of types of content or the number of content elements for each content that can be stored in each information resource 70.

One or more of users 160 may request content 80 at resource 70 via one or more content requests 195. Such content requests may be, for example, an HTTP (Hypertext Transfer Protocol) or FTP (File Transfer Protocol) GET. Content 80 is then transferred across network 60 to user 160 as transferred content 190. So called "push content" may be delivered as transferred content 190 without an immediately preceding content request 195.

In one embodiment, the system 100 may comprise an information resource indexer 110, a query handler 150, and an information resource index 120. The information resource indexer 110 acquires data from information resource network 50, and stores the acquired data relating keyterms to locations in information resource index 120. Optionally, a content store 130 may also be present to store entire content 80 or portions of content 80 in compressed or uncompressed fashion.

The information resource indexer 110 acquires the data from the information resource network 50 by performing the current method for traffic-based content acquisition. In one embodiment, the information resource indexer 110 scans the contents, e.g., web pages, as they are being transferred (e.g., pushed, loaded or updated). For example, when a web page is being loaded onto the information resource 70, the packets may have to traverse a service provider's Internet Protocol (IP) backbone network or an Intranet. For example, when a web page is initially being loaded or subsequently updated on an information resource 70, the packets forming the web page may have to traverse a network. When the transferring (e.g., pushing, loading and/or updating) of the web page is detected, the web page may be scanned by the information resource indexer 110 to acquire data (e.g., one or more content elements) from the web page that can be used to update information resource index 120.

It may happen that when a web page is being loaded, it is done in encrypted form, e.g., using a method such as WebDAV (Web-based Distributed Authoring and Versioning). Advantageously, in one embodiment of the present invention, another source of information index updates may occur when resource 70 provides transferred content 190 to user 160 across network 60. The transferred content 190 is then parsed by information resource indexer 110 and stored in information resource index 120, which relates keyterms with locations. Substantially simultaneously, and optionally, content store 130 may be updated in accordance with transferred content 190. The information resource indexer 110 may then store the acquired data relating location identifiers 75 with the keyterms parsed from content 80 during traversal of network 60 in information resource index 120. It should be noted that in one embodiment, the keyterm index may comprise non-text terms if one or more content elements comprise non-text terms. In another embodiment, the information resource index 120 only contains text terms, but content store 130 may contain text and non-text terms. The text terms may be derived by their association with the non-text terms, e.g., through anchor or URL information making up identifier 75.

In one embodiment, the information resource index 120 provides a mapping between various content elements 85 to identifiers 75. For example, the repository for search data 120 may contain the information shown in Table 1, as a non-limiting illustrative example.

TABLE 1

| | |
|---|---|
| and | http://www.uspto.gov/index.html |
| Office | http://www.officesupplies.com |
| | http://www.uspto.gov/index.html |
| Patent | http://www.shoes.com/catalog/patent_leather.html |
| | http://www.uspto.gov/index.html |
| | http://www.uspto.gov/patft/index.html |
| States | http://www.uspto.gov/index.html |
| Trademark | http://www.uspto.gov/index.html |
| United | http://www.unitedairlines.com/index.html |
| | http://www.uspto.gov/index.html |
| Welcome | http://www.uspto.gov/index.html |

Referring to Table 1, it will be appreciated that each content element 85 may be associated with one or more identifiers 75 in the information resource network 50. For example, as shown in Table 1, the content element "Patent" may appear not only on one or more pages at the USPTO web site such as index.html and patft/index.html, but also at a site selling shoes, specifically patent leather. In general, a given content element 85 may be associated with multiple identifiers 75 and a given identifier 75 may be associated with multiple content elements 85.

In operation, a user 160 interacts with the query handler 150 by providing a query 170 for which query handler 150 will return results 180. The query handler 150 parses the query 170 into one or more content elements and other query elements such as Boolean operators such as AND, OR, and NOT, and identifies matching information resources 70 that meet the search criteria. For example, if a query 170 comprises the search term "patent", then information resources 70 having identifiers of "http://www.uspto.gov/index.html", "http://www.uspto.gov/patft/index.html", and "http://www.shoes.com/catalog/patent_leather.html" will be returned as search results 180. Specifically, query handler 150 is able to return these results by referring to information resource index 120, which is populated by information resource indexer 110.

Those skilled in the art will realize that the communication system 100 may be expanded by including access networks, network elements, data networks, search engines, analysis systems, etc. without altering the present invention. As such, the illustrative example of FIG. 1 is not intended to limit the present invention.

It should be noted that although the present invention is disclosed above in the context of a content having text information such that content elements may comprise one or more alphanumeric terms, the present invention is not so limited. Specifically, if the content is an image sequence, then the content elements may comprise a text title of the image sequence, an image, a portion of an image, a geometric shape, a color, and the like. Similarly, if the content is an audio file, then the content elements may comprise a text title of the audio file, an audio sequence, a portion of an audio sequence, one or more phonemes, and the like.

Figure 2:
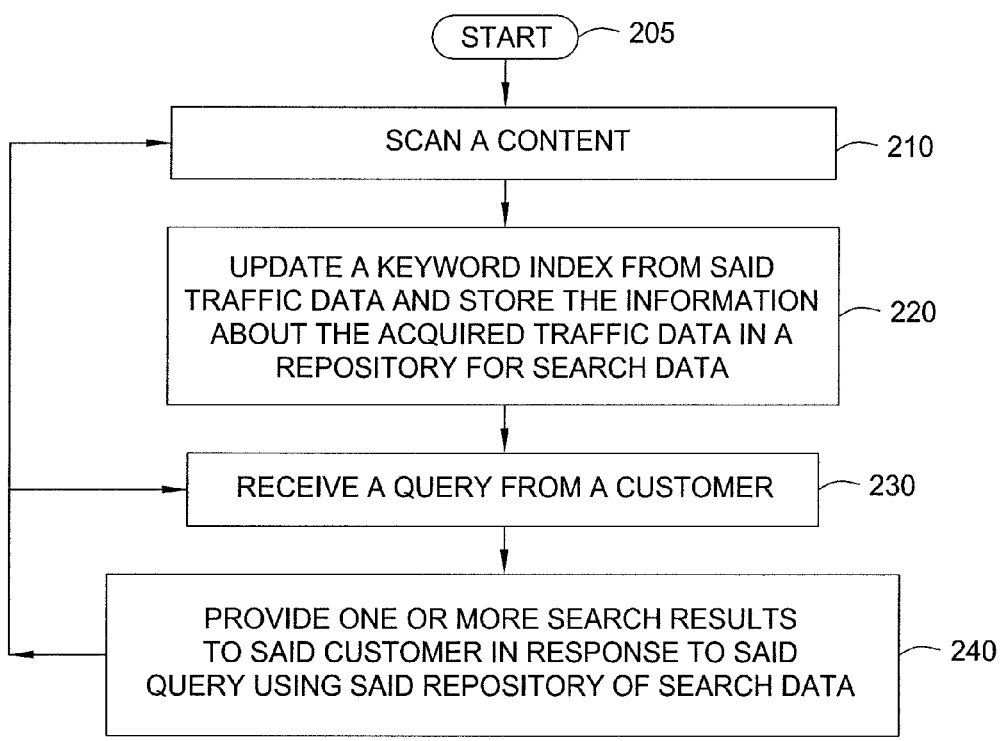
FIG. 2 illustrates a flowchart of one embodiment of a method of the present invention for providing traffic-based content acquisition.

FIG. 2 illustrates a flowchart of one embodiment of a method 200 of the present invention for providing a traffic based web crawler. Method 200 starts in step 205 and proceeds to step 210.

In step 210, method 200 scans a content, e.g., a web page, a file, a document, a spreadsheet, etc., and acquires data as the web page is either being loaded or updated via a network. For example, an information resource indexer scans a web page to learn about its content as the web page is being loaded, pushed, transferred, or updated across a network, e.g., a service provider's network, Intranet, etc. It should be noted that the web page may be scanned even if the web page has not been referred to by a hyperlink.

In step 220, method 200 builds or updates a keyword index from the network traffic data representing the web page, file, document, spreadsheet, etc. and stores the information about the acquired traffic data in a repository for search data. For the example above, the information resource indexer examines the content from step 210 to build a keyword index and stores the data such that a query handler may be able to locate the information in the repository of search data and/or the information index.

For example, if an enterprise website is updated to include new products, the information resource index and optional content store may also be updated to include the new products by scanning the pertinent web page as the update to the website is being loaded and/or on a first or subsequent content transfer and then examining the content. The keyword index may then be used to locate the new products based on the latest update or a recent content push or transfer of the enterprise website or pages therein.

In step 230, method 200 receives a query from a customer. For example, a search engine receives a query for a search term. The method then proceeds to step 240.

In step 240, method 200 provides one or more search results to the customer in response to the query using the information index and/or the content repository. For example, the method analyzes the query to determine individual keywords, image characteristics, and the like. The method then generates and provides the customer with ranked search results. The method then proceeds to step 210 to continue scanning web pages, and/or proceeds to step 230 to continue receiving additional queries.

It should be noted that the various steps of method 200 may occur simultaneously and the above description is not intended to imply a sequential process. For example, method 200 may scan a web page while receiving and processing one or more queries, and so on.

In one embodiment, the system 100 shown in FIG. 1 may contain an optional customer list 101 for traffic-based content acquisition. The optional customer list 101 may be used if the current invention is not implemented for all customers. For example, an enterprise customer may not wish his/her traffic data to be examined for web crawler or web page ranking purposes. Another enterprise customer may wish his/her web site to be located and ranked efficiently by search engines, based on the latest content. The customer list 101 enables the service provider to implement the current invention only for a predetermined set of customers, networks, subnets, IP addresses, URLs, locations, or the like. Customers may then provide their preference to the service provider either during service activation or as an update. The information resource indexer 110 may then implement the present invention only for those customers (or network addresses associated with those customers) listed on the customer list 101. It should be noted that for customers that are not in customer list 101, a traditional web crawler may be used in combination with the principles of the present invention.

In one embodiment, the current method for content acquisition and indexing is implemented as a service feature that can be subscribed to by a customer. For example, business customers with frequent updates on their web sites may wish to have a traffic-based content acquisition service. Namely, business customers may want search engines to easily identify changes in their web sites, thereby increasing customer satisfaction due to timely information. In this embodiment, the network service provider is able to provide the scanning service for a subscription fee. Consumer customers may also leverage the current method implemented as a service feature, for example, a broadband wireline or wireless customer may buy an enhanced search service with more timely and more complete search results based on network-based content acquisition. In this embodiment, the network service provider may provide a search portal to customers, or may provide a search portal business partner with enhanced traffic-based content information on a straight payment or revenue sharing basis. In contrast, individuals with infrequent updates to their web sites and individuals who may not wish their network traffic to be examined may prefer traditional web crawlers that are based on hyperlinks.

In one embodiment, the current method may perform network traffic-based content acquisition when there is a change in a web page. For example, as a web page is initially loaded, the information resource indexer may store a one-way trap door hash of the page (not shown), such as Message Digest 5. When the web page is updated, a change in the hash would then be detected. If a change in the hash is detected, the information resource indexer 110 may then rescan the page and update information resource index 120 and possibly content store 130.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application.

Figure 3:
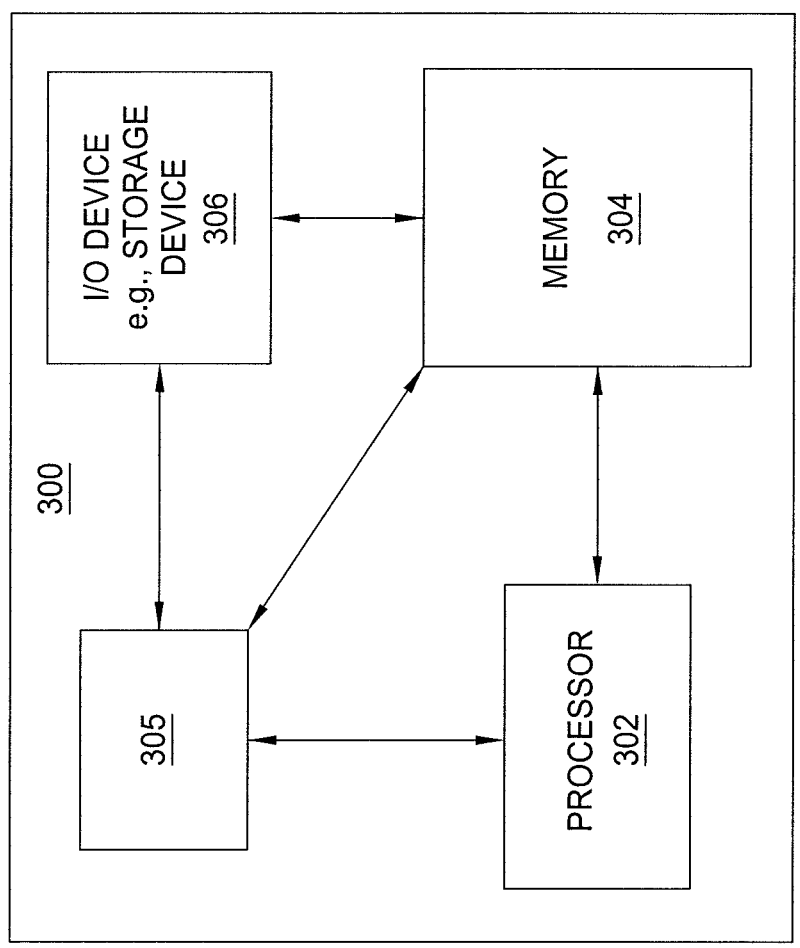
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing a network traffic based web crawler for networks, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 305 for providing traffic-based content acquisition for networks can be loaded into memory 304 and executed by processor 302 to implement the functions as discussed above. As such, the present method 305 for providing a traffic-based content acquisition for networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing packets in a network, the method comprising:
scanning, via a processor, the packets representing a content while the content is traversing the network, where the scanning acquires a plurality of content elements, wherein the content traversing the network comprises a transfer of the packets for loading a web page, wherein the web page being transferred is detected via a hash associated with the web page, wherein when the web page is loaded a change in the hash is detected, wherein the scanning is performed when the packets are associated with a network address of a plurality of network addresses on a customer list;
building, via the processor, a keyterm index from the plurality of content elements, wherein building the keyterm index comprises parsing the plurality of content elements; and
storing, via the processor, the keyterm index in a repository deployed in the network for use in generating a search result in response to receiving a query from a user.

2. The method of claim 1, wherein the building the keyterm index comprises building a keyword index.

3. The method of claim 1, further comprising:
receiving, via a search engine, the query from the user.

4. The method of claim 3, further comprising:
providing, via the search engine, the search result to the user using the keyterm index.

5. The method of claim 1, wherein the customer list having the plurality of network addresses is maintained by a service provider, wherein the plurality of network addresses is associated with a plurality of customers.

6. The method of claim 1, wherein the scanning the packets comprises scanning the packets that are unencrypted.

7. The method of claim 1, wherein the scanning is performed in accordance with a subscribed service by the user.

8. A non-transitory computer-readable medium storing a plurality of instructions which, when executed by a processor, cause the processor to perform operations for processing packets in a network, the operations comprising:
scanning the packets representing a content while the content is traversing the network, where the scanning acquires a plurality of content elements, wherein the content traversing the network comprises a transfer of the packets for loading a web page, wherein the web page being transferred is detected via a hash associated with the web page, wherein when the web page is loaded a change in the hash is detected, wherein the scanning is performed when the packets are associated with a network address of a plurality of network addresses on a customer list;
building a keyterm index from the plurality of content elements, wherein building the keyterm index comprises parsing the plurality of content elements; and
storing the keyterm index in a repository deployed in the network for use in generating a search result in response to receiving a query from a user.

9. The non-transitory computer-readable medium of claim 8, wherein the building the keyterm index comprises building a keyword index.

10. The non-transitory computer-readable medium of claim 8, the operations further comprising:
receiving, via a search engine, the query from the user.

11. The non-transitory computer-readable medium of claim 10, the operations further comprising:
providing, via the search engine, the search result to the user using the keyterm index.

12. The non-transitory computer-readable medium of claim 8, wherein the customer list having the plurality of network addresses is maintained by a service provider, wherein the plurality of network addresses is associated with a plurality of customers.

13. The non-transitory computer-readable medium of claim 8, wherein the scanning the packets comprises scanning the packets that are unencrypted.

14. The non-transitory computer-readable medium of claim 8, wherein the scanning is performed in accordance with a subscribed service by the user.

15. A system for processing packets in a network, the system comprising:
a processor; and
a computer-readable medium storing a plurality of instructions which, when executed by the processor, cause the processor to perform operations, the operations comprising:
scanning the packets representing a content while the content is traversing the network, where the scanning acquires a plurality of content elements, wherein the content traversing the network comprises a transfer of the packets for loading a web page, wherein the web page being transferred is detected via a hash associated with the web page, wherein when the web page is loaded a change in the hash is detected, wherein the scanning is performed when the packets are associated with a network address of a plurality of network addresses on a customer list;
building a keyterm index from the plurality of content elements, wherein building the keyterm index comprises parsing the plurality of content elements; and
storing the keyterm index in a repository deployed in the network for use in generating a search result in response to receiving a query from a user.

16. The system of claim 15, wherein the building the keyterm index comprises building a keyword index.

17. The system of claim 15, the operations further comprising:
receiving, via a search engine, the query from the user.

18. The system of claim 17, the operations further comprising:
providing, via the search engine, the search result to the user using the keyterm index.

19. The system of claim 15, wherein the customer list having the plurality of network addresses is maintained by a service provider, wherein the plurality of network addresses is associated with a plurality of customers.

20. The system of claim 15, wherein the scanning the packets comprises scanning the packets that are unencrypted.

* * * * *